United States Patent
Turcotte et al.

(10) Patent No.: US 11,407,067 B2
(45) Date of Patent: Aug. 9, 2022

(54) METHOD FOR REPAIRING A PART

(71) Applicant: PRATT & WHITNEY CANADA CORP., Longueuil (CA)

(72) Inventors: Julien Turcotte, Saint-Jean-sur-Richelieu (CA); Omar Mbareche, Montreal (CA); Samuel Jacques, Mercier (CA); Benjamin Roy, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 278 days.

(21) Appl. No.: 16/024,065

(22) Filed: Jun. 29, 2018

(65) Prior Publication Data

US 2020/0001404 A1    Jan. 2, 2020

(51) Int. Cl.
| | |
|---|---|
| *B23K 26/70* | (2014.01) |
| *B23K 26/02* | (2014.01) |
| *F02C 3/04* | (2006.01) |
| *F02C 7/18* | (2006.01) |
| *F02C 7/24* | (2006.01) |

(52) U.S. Cl.
CPC ......... *B23K 26/705* (2015.10); *B23K 26/02* (2013.01); *F02C 3/04* (2013.01); *F02C 7/18* (2013.01); *F02C 7/24* (2013.01)

(58) Field of Classification Search
CPC .......... B23K 2101/001; B23K 26/02; B23K 26/389; B23K 26/705; F02C 3/04; F02C 7/18; F02C 7/24
USPC ...................................... 219/121.6
See application file for complete search history.

(56) References Cited

U.S. PATENT DOCUMENTS

| | | | | |
|---|---|---|---|---|
| 3,474,219 A | * | 10/1969 | Meyer | B23K 15/0053 219/121.35 |
| 4,995,087 A | * | 2/1991 | Rathi | B23K 26/032 382/152 |
| 4,998,005 A | * | 3/1991 | Rathi | B23K 26/032 219/121.62 |

(Continued)

FOREIGN PATENT DOCUMENTS

| | | |
|---|---|---|
| EP | 2762252 A1 | 8/2014 |
| GB | 2453853 A | 4/2009 |

(Continued)

OTHER PUBLICATIONS

English translation of International Patent Application No. WO 2011/144860 dated Nov. 24, 2011, https://patents.google.com/patent/WO2011144860A1/en?oq=WO2011144860, accessed on Jul. 24, 2018.

*Primary Examiner* — Ibrahime A Abraham
*Assistant Examiner* — Frederick F Calvetti
(74) *Attorney, Agent, or Firm* — Norton Rose Fulbright Canada LLP

(57) ABSTRACT

Methods for repairing a coated part with holes extending therethrough are disclosed. In one embodiment, a method comprises receiving a part where a coating on a first side of the part at least partially obstructs a first opening of a hole on the first side of the part. Measured hole data indicative of a position of a second opening of the hole on a second side of the part opposite the first side is then acquired. Based on the measured hole data, the first opening of the hole is cleared of the coating by laser drilling via the second opening of the hole.

12 Claims, 10 Drawing Sheets

(56) References Cited

U.S. PATENT DOCUMENTS

| | | | | |
|---|---|---|---|---|
| 5,160,822 A * | 11/1992 | Aleshin | F01D 5/20 | 219/121.64 |
| 5,181,379 A * | 1/1993 | Wakeman | B23K 26/389 | 60/766 |
| 5,216,808 A * | 6/1993 | Martus | B23K 26/032 | 29/889.1 |
| 5,747,769 A * | 5/1998 | Rockstroh | B23K 26/384 | 416/97 R |
| 5,941,686 A | 8/1999 | Gupta et al. | | |
| 6,004,620 A * | 12/1999 | Camm | B23P 6/002 | 427/142 |
| 6,210,488 B1 * | 4/2001 | Bruce | B08B 3/12 | 134/1 |
| 6,380,512 B1 * | 4/2002 | Emer | B23K 26/04 | 219/121.71 |
| 6,573,474 B1 * | 6/2003 | Loringer | F01D 5/288 | 29/889.721 |
| 6,620,457 B2 | 9/2003 | Farmer et al. | | |
| 6,663,919 B2 * | 12/2003 | Farmer | C23C 4/00 | 427/140 |
| 6,701,615 B2 * | 3/2004 | Harding | B23P 6/002 | 29/402.07 |
| 6,723,951 B1 * | 4/2004 | McGraw | B23K 26/04 | 219/121.71 |
| 6,908,657 B2 * | 6/2005 | Farmer | B23P 6/002 | 416/97 A |
| 6,909,800 B2 * | 6/2005 | Vaidyanathan | B23P 6/002 | 250/330 |
| 7,111,783 B2 | 9/2006 | Xi et al. | | |
| 7,216,485 B2 | 5/2007 | Caldwell et al. | | |
| 7,329,832 B2 | 2/2008 | Hoebel et al. | | |
| 7,333,218 B2 * | 2/2008 | Vaidyanathan | B23P 6/002 | 356/608 |
| 7,388,980 B2 * | 6/2008 | Vaidyanathan | B23P 6/002 | 382/152 |
| 7,622,160 B2 * | 11/2009 | Gupta | C23C 4/11 | 427/448 |
| 7,725,210 B2 * | 5/2010 | Hoebel | B23K 26/389 | 700/166 |
| 7,805,822 B2 * | 10/2010 | Hanley | C23C 4/01 | 29/81.09 |
| 7,853,421 B2 * | 12/2010 | Moore | G05B 19/401 | 702/81 |
| 8,262,802 B2 * | 9/2012 | Garry | B24C 3/327 | 134/22.12 |
| 8,437,010 B2 | 5/2013 | Bostanjoglo et al. | | |
| 8,578,581 B2 * | 11/2013 | Bellerose | G05B 19/402 | 29/557 |
| 8,776,370 B2 * | 7/2014 | Staroselsky | F01D 5/005 | 29/889.1 |
| 9,089,933 B2 * | 7/2015 | Shaw | B23K 26/388 | |
| 9,434,025 B2 * | 9/2016 | Elfizy | B23K 26/389 | |
| 9,523,287 B2 * | 12/2016 | Bellino | F04D 29/701 | |
| 9,696,035 B2 | 7/2017 | Starkweather et al. | | |
| 9,707,645 B2 * | 7/2017 | Ozturk | B23P 6/002 | |
| 9,815,141 B2 * | 11/2017 | Forsman | B23K 26/389 | |
| 9,869,186 B2 * | 1/2018 | Xu | F01D 5/186 | |
| 9,962,792 B2 * | 5/2018 | Hu | B23K 26/0876 | |
| 9,987,708 B2 * | 6/2018 | Ivory | F02K 1/822 | |
| 10,131,019 B2 * | 11/2018 | Imaya | B23K 26/142 | |
| 10,265,804 B2 * | 4/2019 | Kriegmair | B23K 26/384 | |
| 10,500,678 B2 * | 12/2019 | Dong | F01D 5/186 | |
| 10,859,367 B2 * | 12/2020 | Ozturk | H04N 5/2256 | |
| 2002/0069644 A1 * | 6/2002 | Stuttaford | F23R 3/005 | 60/772 |
| 2003/0066821 A1 * | 4/2003 | Wybrow | B23K 26/389 | 219/121.71 |
| 2004/0134897 A1 * | 7/2004 | Das | B23K 26/382 | 219/121.71 |
| 2006/0157456 A1 * | 7/2006 | Hoebel | B23K 26/389 | 219/121.71 |
| 2007/0241084 A1 * | 10/2007 | Hoebel | F01D 5/005 | 219/121.71 |
| 2008/0085395 A1 * | 4/2008 | Fernihough | B23P 6/007 | 428/131 |
| 2009/0142548 A1 * | 6/2009 | Patterson | F23R 3/007 | 428/137 |
| 2009/0213216 A1 * | 8/2009 | Hastilow | G05B 19/401 | 348/142 |
| 2009/0220349 A1 * | 9/2009 | Bolms | F01D 5/005 | 416/97 R |
| 2011/0287191 A1 | 11/2011 | Martin et al. | | |
| 2013/0146570 A1 * | 6/2013 | Forsman | B23K 26/389 | 219/121.71 |
| 2013/0268107 A1 | 10/2013 | Bostanjoglo et al. | | |
| 2014/0046478 A1 | 2/2014 | Bellerose et al. | | |
| 2014/0248425 A1 * | 9/2014 | Patterson | F23R 3/007 | 427/142 |
| 2015/0160644 A1 * | 6/2015 | Reid | G05B 19/182 | 29/402.19 |
| 2015/0190890 A1 * | 7/2015 | Ozturk | B23H 9/14 | 408/1 R |
| 2015/0258634 A1 * | 9/2015 | Basdere | B23K 26/384 | 29/889.71 |
| 2016/0074969 A1 * | 3/2016 | Kriegmair | G05B 19/4099 | 700/98 |
| 2016/0223315 A1 * | 8/2016 | Ozturk | G01B 11/002 | |
| 2016/0243654 A1 * | 8/2016 | Hu | B23K 26/042 | |
| 2016/0243655 A1 * | 8/2016 | Hu | B23K 26/388 | |
| 2016/0290158 A1 * | 10/2016 | Slavens | F01D 17/14 | |
| 2016/0297033 A1 * | 10/2016 | Imaya | B23K 26/16 | |
| 2016/0332229 A1 * | 11/2016 | Snyder | B22F 5/04 | |
| 2017/0183968 A1 * | 6/2017 | Xu | F01D 9/065 | |
| 2018/0099360 A1 * | 4/2018 | Dong | B21D 53/78 | |
| 2018/0111230 A1 * | 4/2018 | Imaya | B23K 26/388 | |
| 2019/0039177 A1 * | 2/2019 | Reed | B23K 26/282 | |
| 2019/0106994 A1 * | 4/2019 | Ng | F01D 5/186 | |
| 2019/0134752 A1 * | 5/2019 | Grafton-Reed | B23K 26/389 | |
| 2020/0025085 A1 * | 1/2020 | Zacchera | C23C 4/01 | |
| 2022/0001500 A1 * | 1/2022 | Rahman | F01D 5/005 | |

FOREIGN PATENT DOCUMENTS

| | | |
|---|---|---|
| WO | 2005122713 A2 | 12/2005 |
| WO | 2011144860 A1 | 11/2011 |

* cited by examiner

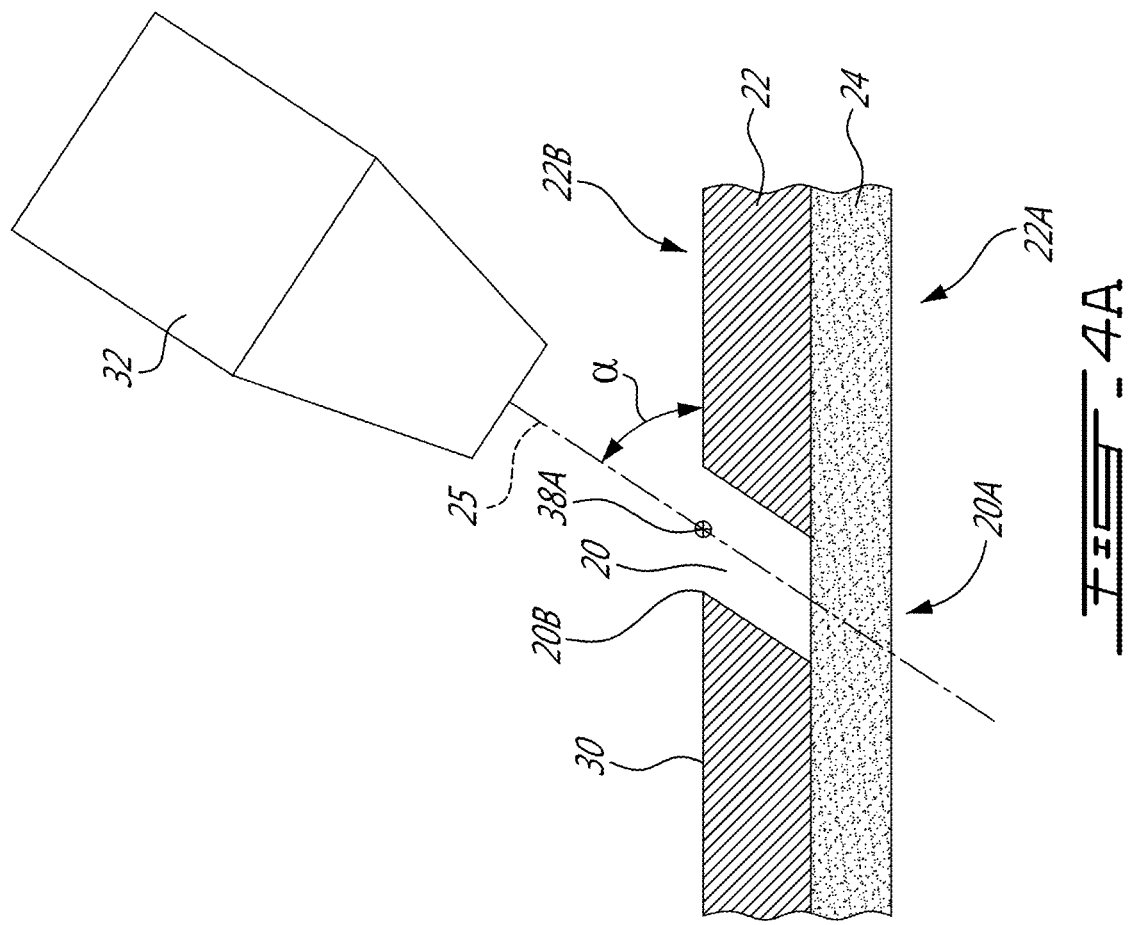

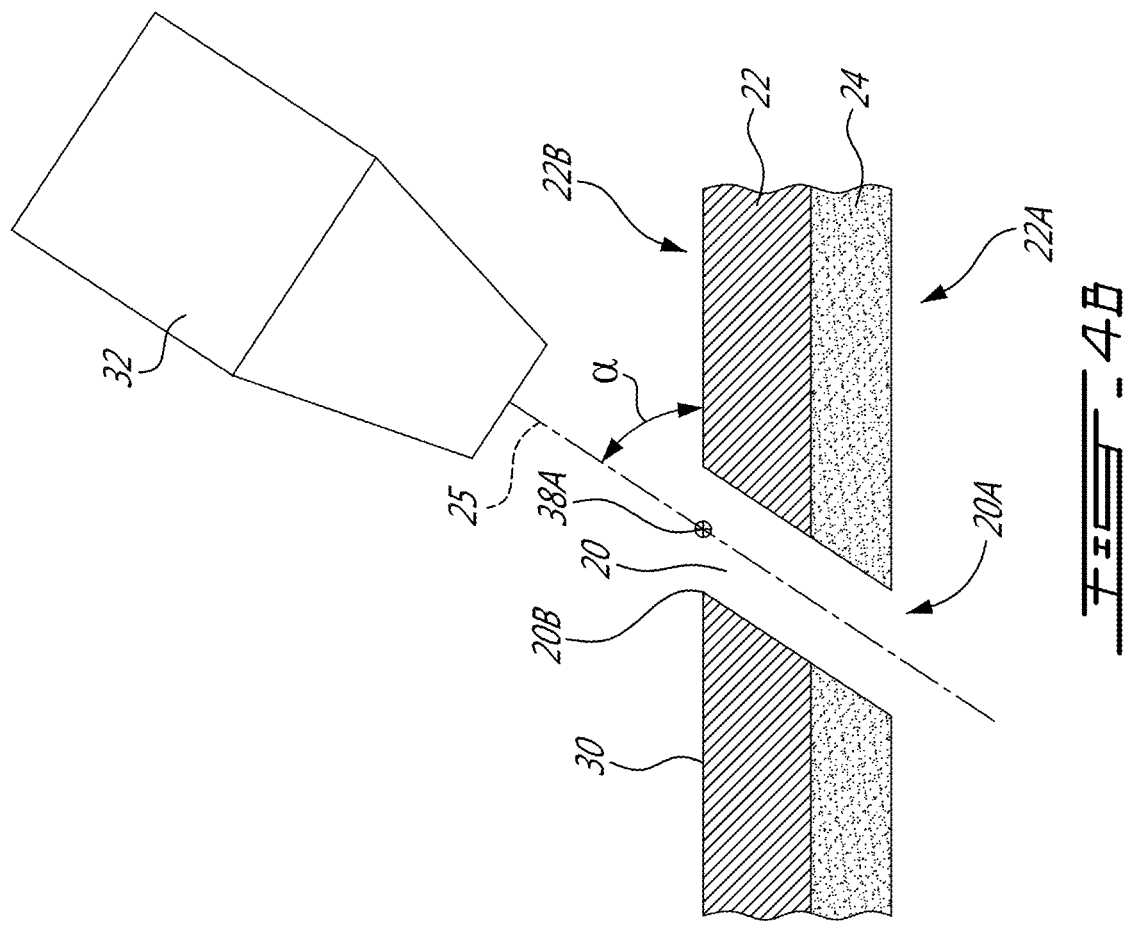

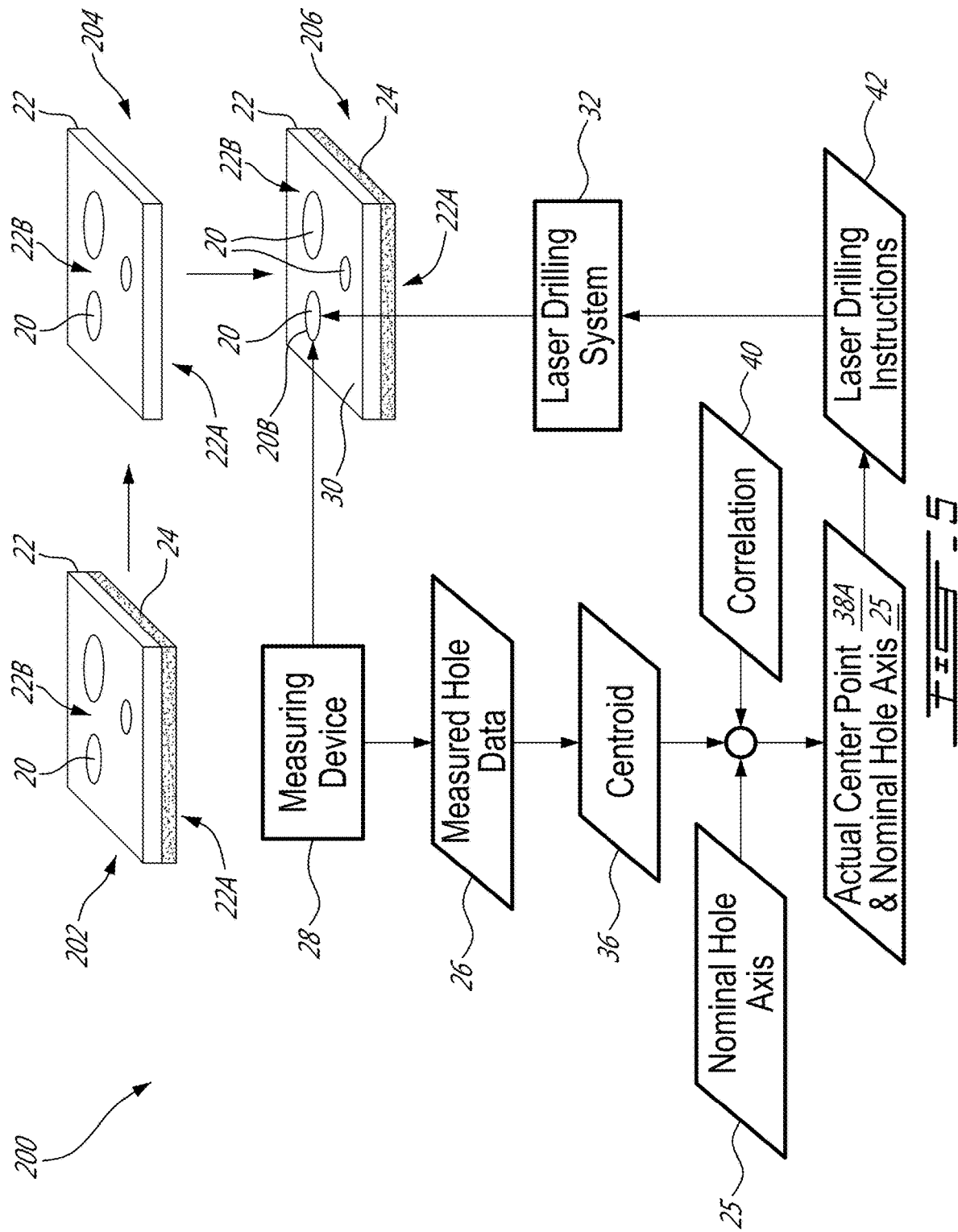

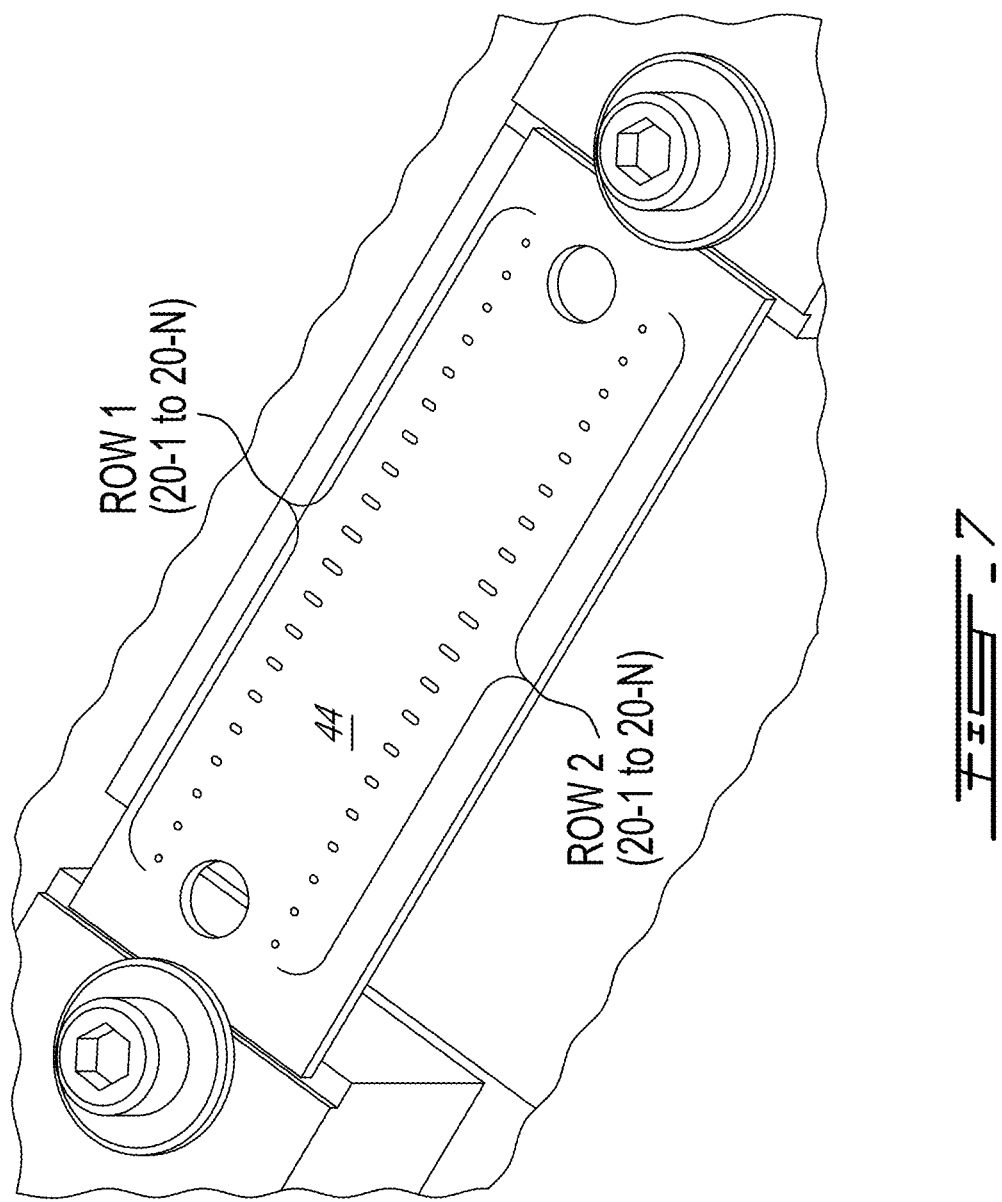

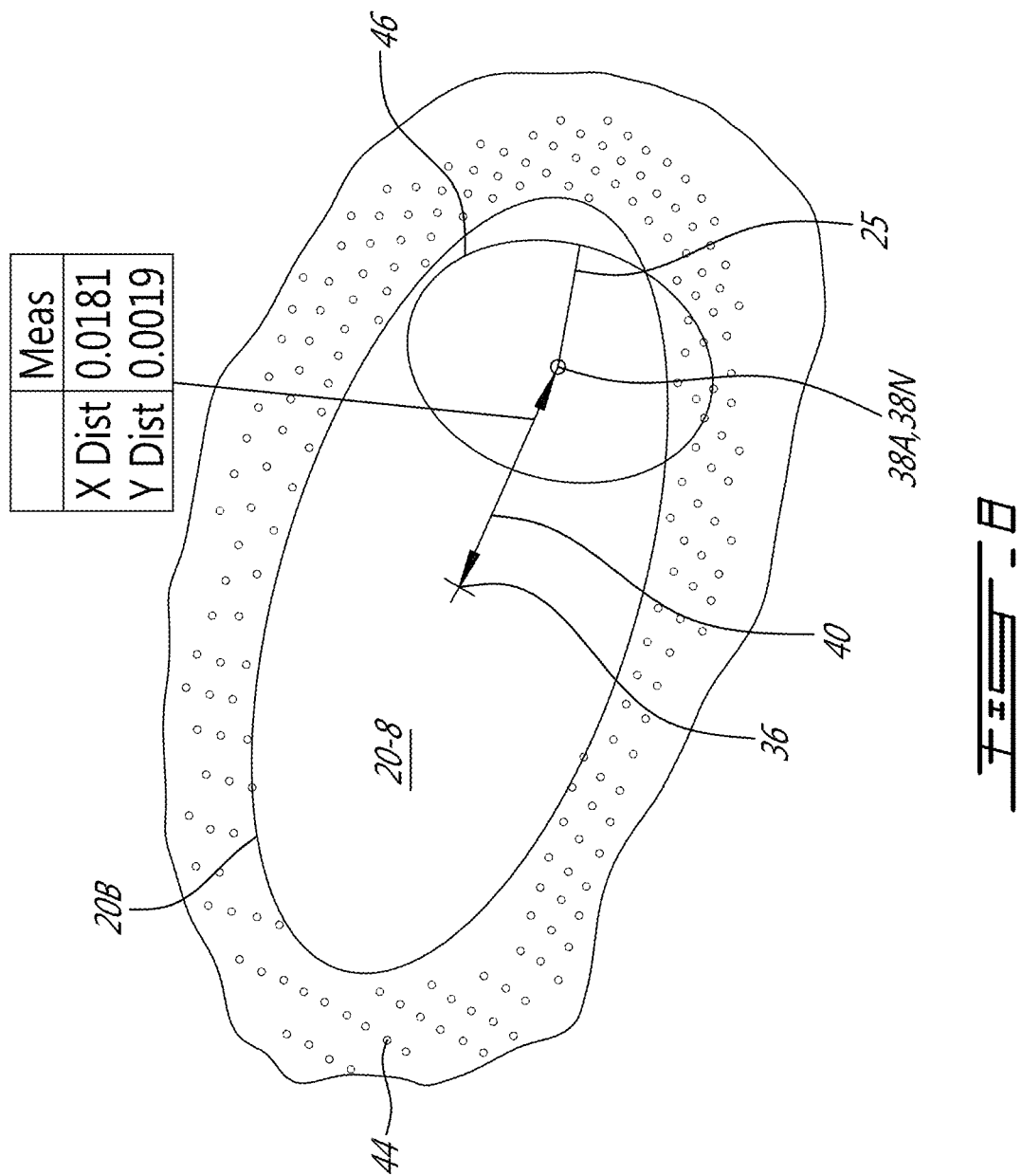

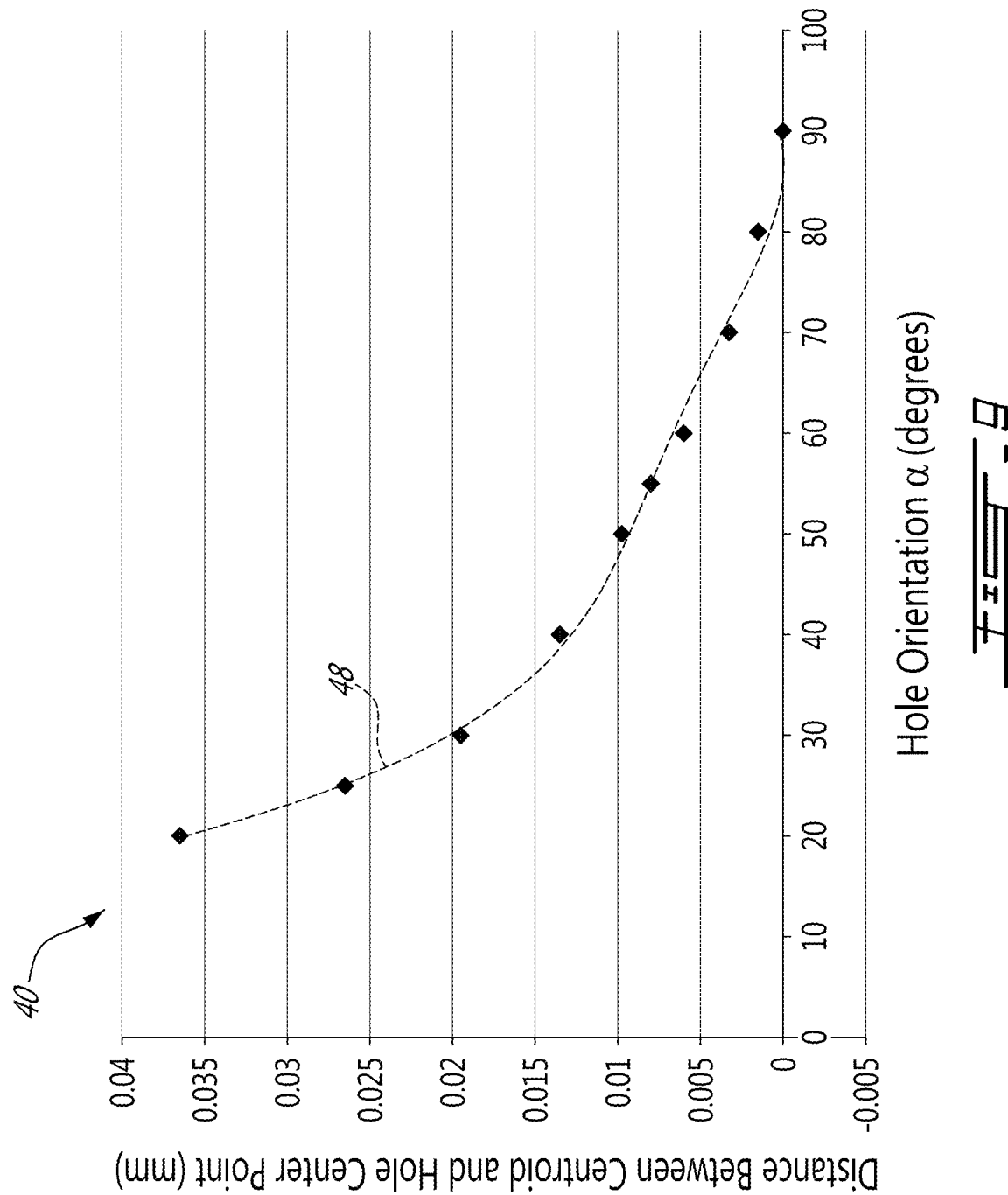

METHOD FOR REPAIRING A PART

TECHNICAL FIELD

The disclosure relates generally to repairing parts, and more particularly to repairing coated parts that contains holes.

BACKGROUND

A liner of a combustion chamber of a gas turbine engine can comprise a plurality of effusion holes extending therethrough that facilitate the generation of a layer of cooling air that protects the liner from relatively high temperatures exhibited inside the combustion chamber. The effusion holes are sized and distributed on the liner so that the flow of cooling air through the liner is within a certain range. Such a liner can also comprise a thermal barrier coating (TBC) to further protect the liner from the high temperature environment inside the combustion chamber. During service, the TBC can become damaged and its protective function can become compromised. Replacing the liner with a new liner can be costly. Improvement is desirable.

SUMMARY

In one aspect, the disclosure describes a method for clearing a combustor hole at least partially obstructed by a coating on a combustor part of a gas turbine engine. The method comprises:

receiving the combustor part having a coating on a first side of the combustor part at least partially obstructing a first opening of the hole on the first side of the combustor part;

acquiring measured hole data indicative of a position of a second opening of the hole on a second side of the combustor part opposite the first side; and clearing the first opening of the hole of the coating by laser drilling via the second opening of the hole based on the measured hole data.

A nominal axis of the hole may be non-normal to a surface of the second side of the combustor part comprising the second opening. The method may comprise: using the measured hole data, identifying a centroid of an outline of the second opening of the hole defined on the surface of the second side of the combustor part; and using the nominal axis of the hole, the centroid and a correlation, determining an actual center point of the hole.

The method may comprise generating laser drilling instructions based on the actual center point and the nominal axis of the hole.

The correlation may be based on measured test data associated with a test hole formed by laser drilling through a surface of a test sample. The test hole may have a nominal test hole axis that is non-normal to the surface of the test sample. The measured test data may be indicative of an outline of an opening of the test hole defined on the surface of the test sample. The correlation may comprise a distance between a centroid of the outline of the opening of the test hole and a nominal center point of the test hole.

The correlation may be based on measured test data associated with a plurality of test holes formed by laser drilling through a surface of a test sample. The test holes may have different nominal test hole axis orientations that are non-normal to the surface of the test sample. The measured test data may be indicative of an outline of an opening of each test hole defined on the surface of the test sample. The correlation may comprise respective distances between a centroid of the outline of the opening of each test hole and a nominal center point of each test hole.

The correlation may define a relation between the centroid and an actual center point of the hole as a function of the nominal axis of the hole.

The method may comprise using the measured hole data to retrieve the nominal axis of the hole.

The second opening of the hole may be substantially unobstructed by the coating.

Embodiments can include combinations of the above features.

In another aspect, the disclosure describes a method for repairing a gas turbine engine part having a coated first side and a second side opposite the first side where the part has a hole extending through the part from the first side to the second side. The method comprises:

removing an existing coating from the first side of the part;

applying a new coating on the first side of the part, the new coating at least partially obstructing a first opening of the hole on the first side;

after applying the new coating, acquiring measured hole data indicative of a position of a second opening of the hole on the second side; and clearing the first opening of the hole of the new coating by laser drilling via the second opening of the hole based on the measured hole data.

A nominal axis of the hole may be non-normal to a surface of the second side of the part comprising the second opening. The method may comprise: using the measured hole data, identifying a center of an elliptical outline defined by the second opening of the hole on a surface of the second side; and using the nominal axis of the hole, the center of the elliptical outline and a correlation, determining an actual center point of the hole.

The method may comprise generating laser drilling instructions based on the actual center point and the nominal axis of the hole.

The correlation may be based on measured test data associated with a test hole formed by laser drilling through a surface of a test sample. The test hole may have a nominal test hole axis that is non-normal to the surface of the test sample. The measured test data may be indicative of a center of an elliptical outline defined by an opening of the test hole on the surface of the test sample. The correlation may comprise a distance between the center of the elliptical outline defined by the opening of the test hole and a nominal center point of the test hole.

The correlation may define a relation between the center of the elliptical outline and an actual center point of the hole as a function of the nominal axis of the hole.

The second opening of the hole may be substantially unobstructed by the new coating.

Embodiments can include combinations of the above features.

In a further aspect, the disclosure describes a method for clearing an obstructed hole in a gas turbine engine part using laser drilling. The method comprises:

forming a plurality of test holes in one or more test samples using laser drilling, the test holes having different respective nominal center points and different respective nominal hole axis orientations;

determining, from measured data acquired from the plurality of test holes, respective centroids of outlines defined by openings of the test holes on one or more surfaces of the one or more test samples;

identifying a correlation between the centroids and the nominal center points of the test holes as a function of nominal hole axis orientation;

determining, from measured data acquired from the obstructed hole, a centroid of an outline defined by an opening of the obstructed hole on a surface of the part; and clearing the obstructed hole by laser drilling using an actual center point of the obstructed hole determined from the correlation and the centroid of the outline defined by the opening of the obstructed hole on the surface of the part.

The method may comprise clearing the obstructed hole by laser drilling along a nominal hole axis of the obstructed hole.

The opening of the obstructed hole may be an unobstructed opening of the obstructed hole and the method may comprise clearing an obstructed opening of the obstructed hole by laser drilling via the unobstructed opening of the obstructed hole.

The method may comprise: using the measured data acquired from the obstructed hole to identify a nominal hole axis of the obstructed hole; and using the nominal hole axis of the obstructed hole and the correlation to identify the actual center point of the obstructed hole.

The different respective nominal hole axes of the test holes may span over a range of orientations and the correlation may be continuous over the range of orientations.

The correlation may comprise a fourth order polynomial.

Embodiments can include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIGS. 4A and 4B schematically illustrate laser drilling of the part of FIG. 3 showing states where the hole is obstructed and then cleared respectively;

FIG. 5 is a flow diagram illustrating an exemplary method for repairing a part of the gas turbine engine of FIG. 1;

FIG. 7 is a perspective view of a test sample used to determine the correlation;

FIG. 8 is a perspective view of an exemplary opening of a test hole drilled in the test sample of FIG. 7; and FIG. 9 is a plot illustrating an exemplary correlation for assisting with repairing the part.

DETAILED DESCRIPTION

The following disclosure relates to methods for repairing a combustor liner of a gas turbine engine or other coated parts that have holes extending therethrough. In some embodiments, the methods disclosed herein can include replacing the coating on the part and then re-drilling through the existing holes using laser drilling in order to clear the holes of replacement coating material. It is understood that "clearing" the holes as used herein is intended to encompass partial clearing of the holes of the replacement coating material.

In some embodiments, the methods disclosed herein can include the use of a predetermined correlation to locate the holes that require clearing by laser drilling in order to facilitate accurate re-drilling of the holes without significantly changing the sizes/configurations of the existing holes and hence without significantly affecting the air flow through the part after returning the part to service. As such, the methods disclosed herein can permit the part to be repaired while maintaining its design intent based on intended air flow requirements. In some embodiments, the methods disclosed herein can reduce scrap material and repair costs by reusing the based material of the part instead of having to replace the part entirely. Methods disclosed herein can also be used during the original manufacture of coated parts.

Aspects of various embodiments are described through reference to the drawings.

Figure 1:
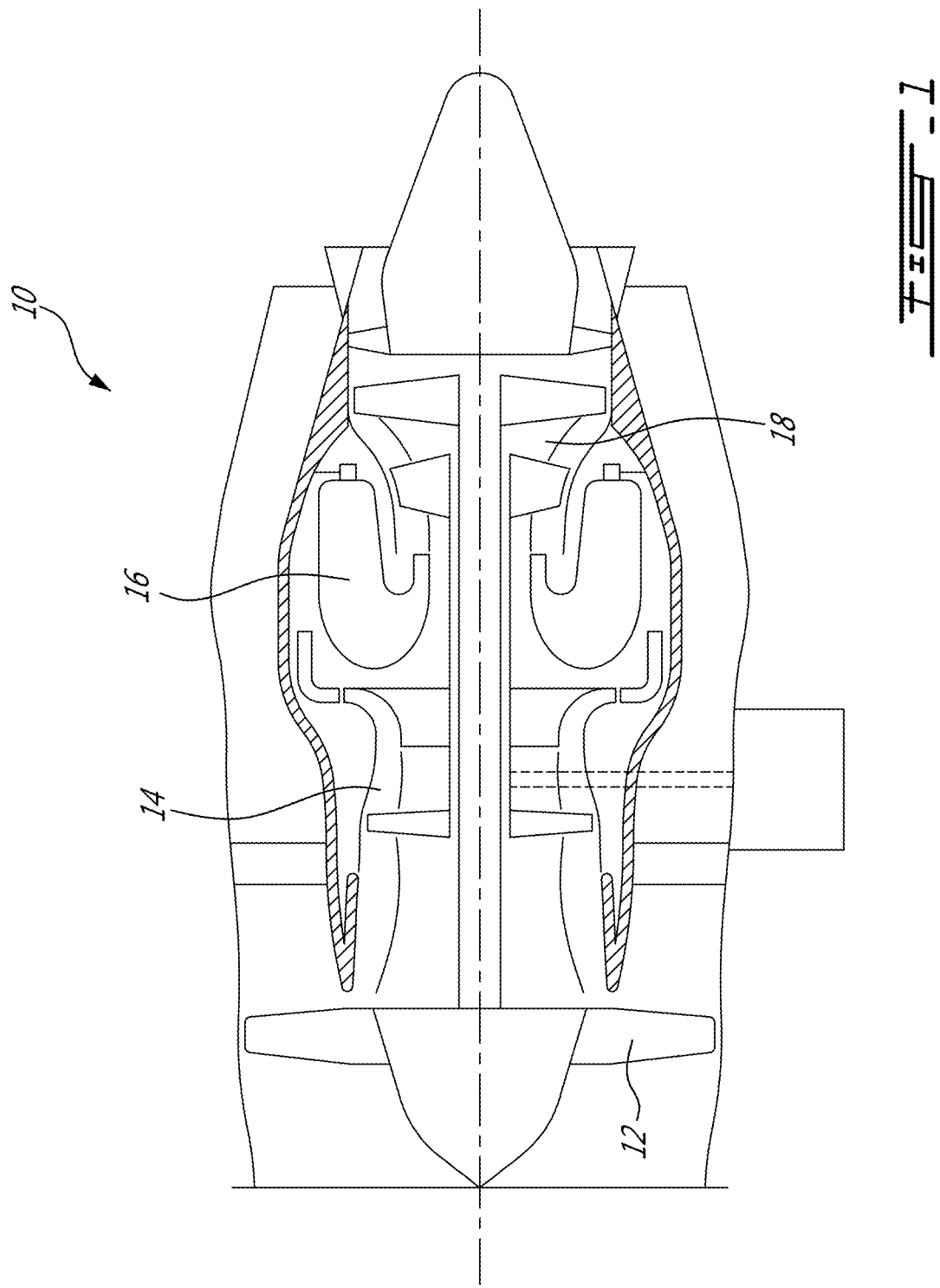
FIG. 1 shows an axial cross-section view of a turbo-fan gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. The methods disclosed herein can be used to repair parts of engine 10 or other types of perforated components that can require a thermal barrier coating (TBC) or other type(s) of coating.

Figure 2:
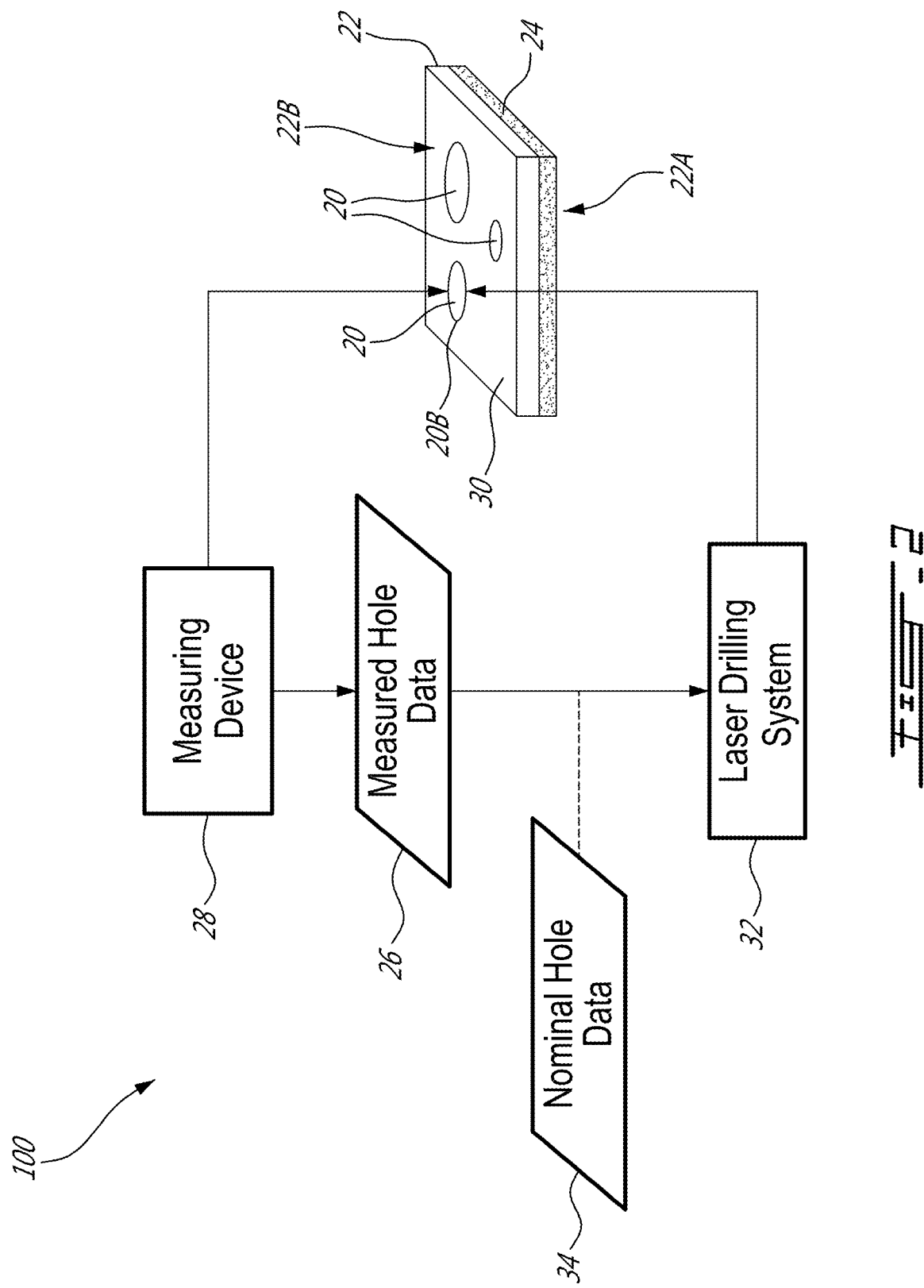
FIG. 2 is a flow diagram illustrating an exemplary method for clearing a hole in a part of the gas turbine engine of FIG. 1.

FIG. 2 is a flow diagram illustrating an exemplary method 100 for clearing one or more holes 20 in part 22 of gas turbine engine 10. It is understood that aspects of method 100 can be combined with aspects of other methods disclosed herein. Some aspects of method 100 can be performed with the use of a computer and can be automated. In various embodiments, part 22 can be, for example, a combustor liner, a combustor shield, a blade or a vane ring of engine 10. Part 22 can have an annular or a non-annular configuration. Part 22 can contain one or more holes 20 extending therethrough.

In some embodiments where part 22 is a combustor liner for example, holes 20 can be effusion cooling holes through which some of the compressed air enters combustor 16 during operation of engine 10. The individual sizes, orientations and distribution (e.g., spacing and pitch) of holes 20 through part 22 can be configured to provide a desired flow rate of air into combustor 16 and also protect combustor 16 from the elevated temperatures associated with the combustion process. Holes 20 can be (e.g., laser) drilled through part 22 at normal or oblique (i.e., non-normal) angles relative to respective surfaces 30 of part 22 through which respective holes 20 extend. Holes 20 can extend linearly across the thickness of part 22. During operation, the air can flow through holes 20 and form a film cooling layer along the first (e.g., inner) side 22A of part 22 via a process known as effusion cooling. Accordingly, the configuration of holes 20 can be selected (e.g., calibrated) based on air flow requirements to provide a desired cooling effect on part 22. In some embodiments, part 22 can be manufactured according to the teachings of U.S. Pat. No. 8,578,581 entitled METHOD OF MAKING A PART AND RELATED SYSTEM, which is incorporated herein by reference.

Part 22 can be made from a suitable metallic material such as a nickel-based alloy for example selected based on the environmental conditions to which part 22 is exposed. In some embodiments, part 22 can be in the form of a relatively thin sheet formed to the desired geometry. Part 22 can comprise TBC 24 bonded thereto for providing further protection against the elevated temperatures to which part 22 can be exposed. It is understood that aspects of this disclosure are applicable to parts 22 having other types of coatings as well. TBC 24 can be applied and bonded to only one side (e.g., first side 22A) of part 22 which is directly exposed to the hot gasses produced by the combustion process. For example, the coated first side 22A of part 22 can be facing the combustion process during operation of engine 10. TBC 24 can, for example, comprise a suitable MCrAlY material which can offer thermal and corrosion protection and where M denotes nickel, cobalt, iron or mixtures thereof; Cr denotes chromium; Al denotes aluminium; and Y denotes yttrium. TBC 24 can comprise a ceramic layer applied on top of the MCrAlY layer to provide further thermal protection. An example of such ceramic coating material is yttria stabilised zirconia (YSZ) which can be applied on top of the MCrAlY layer. The MCrAlY and ceramic protective coatings can be applied by physical vapour deposition (PVD), chemical vapour deposition (CVD) or plasma spraying means for example.

During service, part 22 can be subjected to cyclic exposure to relatively harsh environmental conditions (e.g., hot combustion gasses) inside of combustor 16 and degradation of TBC 24 can occur over time. For example, portions of TBC 24 can become cracked and/or some portions of TBC 24 can become removed from part 22 and thereby expose the underlying metallic material of part 22. Instead of having to replace part 22 entirely, the methods disclosed herein can be used to repair part 22 by reusing the base material without significantly altering the configuration of holes 20 and hence without significantly altering the (e.g., calibrated) air flow conditions across part 22.

In various embodiments, method 100 can be used to clear one or more holes 20 that may have been at least partially obstructed by the replacement TBC 24 on part 22. For example, method 100 can comprise receiving part 22 in a state where TBC 24 on first side 22A has already been replaced and at least partially obstructs one or more holes 20. Then, clearing the one or more holes obstructed by TBC 24 can be carried out using laser drilling. In some embodiments, method 100 can include the step of replacing TBC 24. The replacement of TBC 24 can comprise removing an existing (i.e., damaged) TBC 24 from part 22 and applying a new TBC 24 onto part 22 as explained above. The removal of the existing TBC 24 can comprise sand-blasting for example. Aspects of method 100 are further described below in reference to FIGS. 3-4B.

Figure 3:
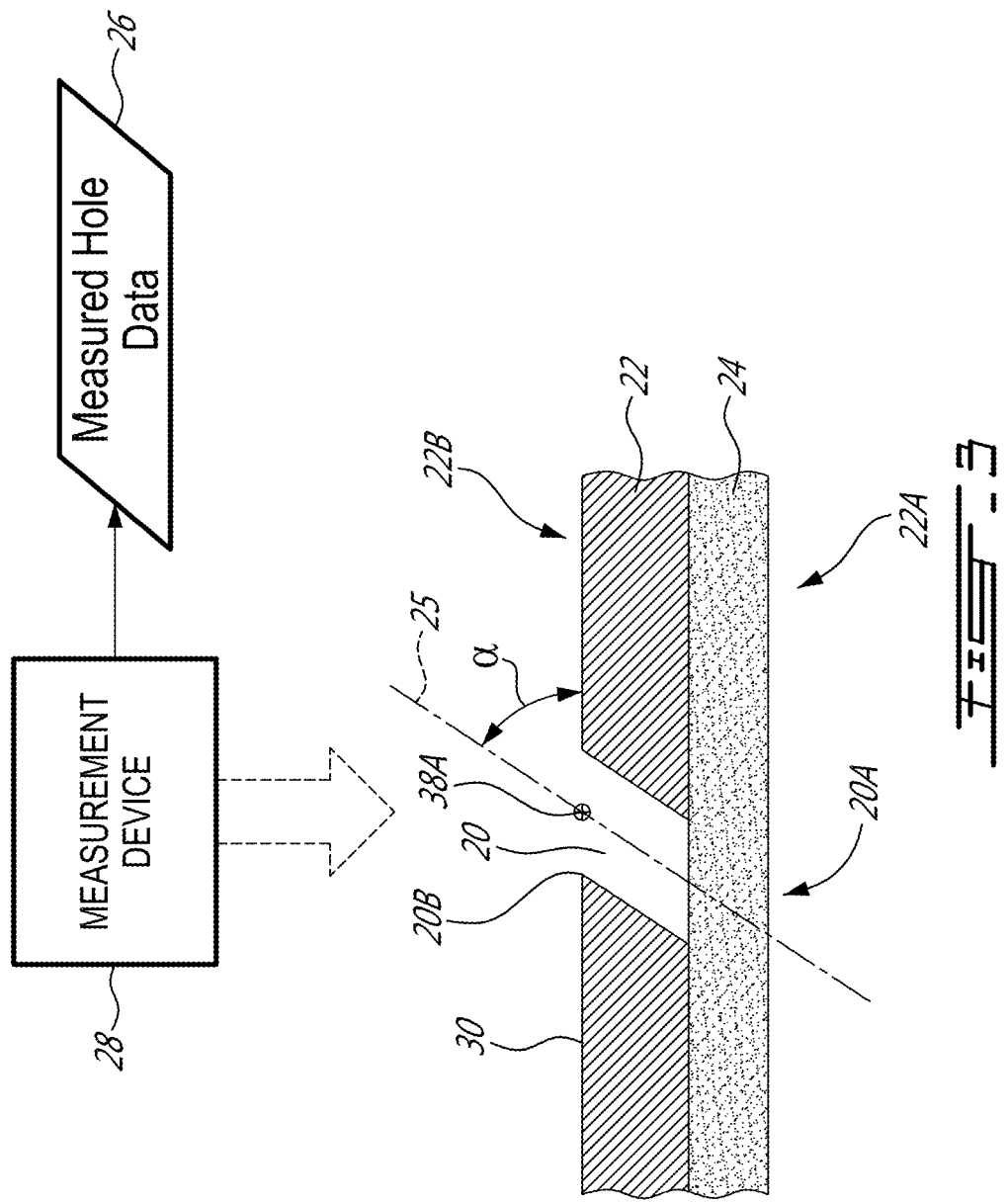
FIG. 3 schematically illustrates the acquisition of data associated with an obstructed hole in the part of the gas turbine engine of FIG. 1.

FIG. 3 schematically illustrates the acquisition of measured hole data 26 associated with an obstructed hole 20 in part 22. The replacement TBC 24 can obstruct one or more first openings 20A of respective holes 20 as shown in FIG. 3. Hole 20 can have a hole axis 25 oriented at an angle α relative to a portion of surface 30 in which hole opening 20B is defined. Method 100 can comprise acquiring measured hole data 26 indicative of a position of second (unobstructed) opening 20B of hole 20 on a second side 22B of part 22. Second (i.e., uncoated) side 22B of part 22 can be opposite to first (i.e., coated) side 22A of part 22. Measured hole data 26 can be acquired using any suitable type of measurement device 28. In some embodiments, measurement device 28 can be configured for contact measurement and can comprise a suitable coordinate measurement machine (CMM). In some embodiments, measurement device 28 can comprise a non-contact measurement device. For example, measurement device 28 can comprise an optical (e.g., laser, blue light, white light) 3D scanner. In some embodiments a combination of contact and non-contact measuring techniques can be used with the methods disclosed herein. Even though aspects of the methods disclosed herein are described in relation to a single hole 20 for clarity, it is understood that the methods disclosed herein can be used with a plurality (e.g., 10's, 100's or 1000's) of holes 20 that extend through part 22.

FIG. 4A schematically illustrates an initial stage of clearing hole 20 using laser drilling system 32 where first opening 20A of hole 20 is shown as still being obstructed by TBC 24. FIG. 4B schematically illustrates a later stage of clearing hole 20 using laser drilling system 32 where first opening 20A of hole 20 is shown as being cleared from material from the replacement TBC 24.

Measured hole data 26 can be used to locate hole 20 and generate instructions for use with laser drilling system 32 in order to drill through hole 20 and consequently clear hole 20 of the material from the replacement TBC 24. In some embodiments, nominal hole data 34 can optionally also be used to instruct laser drilling system 32 for the re-drilling procedure. For example, nominal hole data 34 can be part of a digital representation such as computer aided design (CAD) model from which part 22 was initially manufactured. In some embodiments, the geometry of part 22 may have been altered during service and/or during the application of TBC 24 due to heat exposure for example. Accordingly, the use of nominal hole data 34 alone may not be sufficient to control laser drilling system 32 to conduct drilling of hole 20 to the desired level of accuracy required to substantially restore the air flow conditions across part 22 and restore part 22 to its original design intent. In some embodiments, a combination of measured hole data 26 and nominal hole data 34 can be used as a basis for instructing laser drilling system 32. For example, data indicative of the position of opening 20B can be acquired via measurement device 28 and used as a basis to identify the corresponding hole definition in the digital representation of part 22. For example, a best-fit algorithm can use measured hole data 26 to identify the corresponding hole definition in the digital representation of part 22 in order to retrieve nominal hole data 34. Nominal hole data 34 can include nominal hole axis 25 representative of the orientation of hole 20, a nominal hole diameter, a nominal hole depth and coordinates of a nominal hole center point which may or may not lie in surface 30.

Using measured hole data 26 and optionally nominal hole data 34, suitable instructions can be generated to control laser drilling system 32 during the clearing of obstructed hole 20. In some embodiments, such instructions can comprise computer numerical control (CNC) commands for controlling the positioning of laser drilling system 32 for the re-drilling operation and other instructions for controlling other parameters of laser drilling system 32. Such instructions can be generated using a suitable computer-aided-design/computer-aided-manufacturing (CAD/CAM) system for example. Since first opening 20A is obstructed by TBC 24, measurement device 28 can be used to acquire measured hole data 26 associated with second opening 20B of hole 20 and laser drilling can be conducted via second opening 20B from second side 22B of part 22 as shown in FIGS. 4A and 4B.

FIG. 5 is a flow diagram illustrating an exemplary method 200 for repairing part 22. Aspects of method 200 can be combined with aspects of other methods disclosed herein. Some aspects of method 200 can be performed with the use of a computer and can be automated. At step 202, part 22 is received with an existing TBC 24 disposed on first side 22A of part 22. Part 22 may have been in service for some time and may have been subjected to cyclic exposure to harsh environmental conditions. Accordingly, part 22 may be in need of repair due to degradation of the existing TBC 24. At step 204, the existing TBC 24 has been removed from first side 22A of part 22. In some embodiments, removing TBC 24 may be done by sand-blasting. At step 206, a replacement TBC 24 has been applied to first side 22A of part 22. In various embodiments, the replacement TBC 24 may be of the same type or of a different type than the existing TBC 24. The replacement TBC 24 can be applied to first side 22A according to known or other methods. The application of the replacement TBC 24 can at least partially obstruct some of holes 20 (e.g., see FIG. 4A). For example, material from the replacement TBC 24 can partially or completely obstruct some first openings 20A of holes 20. In some embodiments, some second openings 20B of holes 20 may remain unobstructed by the application of the replacement TBC 24.

In some situations, some of the base material of part 22 may also be damaged. In such cases, depending on the extent of the damage, it can be possible to remove (e.g., cut) such damaged portion and keep a majority of the base material of part 22 for refurbishment. A new replacement portion of base material can be added to the base material being reused by welding for example before the application of the replacement TBC 24. In this situation, any holes 20 that were located in the removed damaged portion of the base material would have to be re-drilled through the base material and through the replacement TBC 24.

After the replacement TBC 24 has been applied to first side 22A of part 22, part 22 can be mounted into a suitable fixture with which the data acquisition and the laser drilling can be performed. It can be desirable to use the same fixture for both tasks without having to remove part 22 from the fixture between the data acquisition and laser drilling steps. Accordingly common datum features which can be part of the fixture or of part 22 itself can be used for data acquisition and laser drilling and be easily transferred between stations. This can reduce the potential for positioning errors introduced between the data acquisition and laser drilling steps. Measuring device 28 can be used to acquire measured hole data 26 that is indicative of a position of second opening 20B of hole 20 on second side 22B of part 22. The acquisition of measured hole data 26 after the application of replacement TBC 24 can be advantageous in some situations where the application of the replacement TBC 24 could potentially cause some deformation of part 22 due to the application of heat for example. This way, any deformation caused by the application of the replacement TBC 24 can be taken into account in measured hole data 26.

In some embodiments, measured hole data 26 can be representative of a shape of an outline of second opening 20B that is formed in surface 30 for example. In cases where hole 20 has a circular cross-section and in situations where hole 20 has nominal hole axis 25 that is substantially normal to surface 30, the shape of the outline of second opening 20B formed in surface 30 would be substantially circular. However, in cases where hole 20 has nominal hole axis 25 that is oriented obliquely to surface 30, the outline of second opening 20B formed in surface 30 would have an elliptical shape. The aspect ratio of the elliptically-shaped outline of second opening 20B can depend on the orientation of nominal hole axis 25 relative to surface 30. In some embodiments, surface 30 or a relevant portion thereof can be planar so the outline of second opening 20B can also be planar.

Measured hole data 26 can be used to identify centroid 36 of the outline of second opening 20B of hole 20 formed in surface 30 of second side 22B of part 22. In the case of an ellipse or a circle, centroid 36 can correspond to a center of such ellipse or circle. The identification of centroid 36 of the outline of second opening 20B can be performed using suitable metrology software solution such as POLY-WORKS® for example. Using centroid 36 and nominal hole axis 25 identified from nominal hole data 34, actual center point 38A of hole 20 can be determined based on a predetermined correlation 40. As explained below, correlation 40 can define a relation between centroid 36 of the elliptically-shaped outline of second opening 20B and actual center point 38A of hole 20 as a function of the orientation α of nominal hole axis 25 of the same hole 20. In some embodiments, the identified centroid 36 can also be used to identify applicable nominal hole data 34 from a nominal digital representation of part 22 via best-fitting and consequently to retrieve nominal hole axis 25 associated with the applicable hole 20. Correlation 40 can serve as a compensation mechanism for identifying the actual center point 38A of hole 20 based on the outline of second opening 20B of hole 20 defined at surface 30 of part 22 and also based on the orientation α of hole 20.

The actual center point 38A and nominal hole axis 25 can be used together to determine suitable positioning of laser drilling system 32 for conducting laser drilling of hole 20. For example, laser drilling instructions 42 can then be generated to cause laser drilling system 32 to be oriented according to nominal hole axis 25 and positioned according to actual center point 38A for laser drilling of hole 20 via second opening 20B as shown in FIGS. 4A and 4B without significantly affecting the existing hole geometry defined in the base material of part 22.

Figure 6:
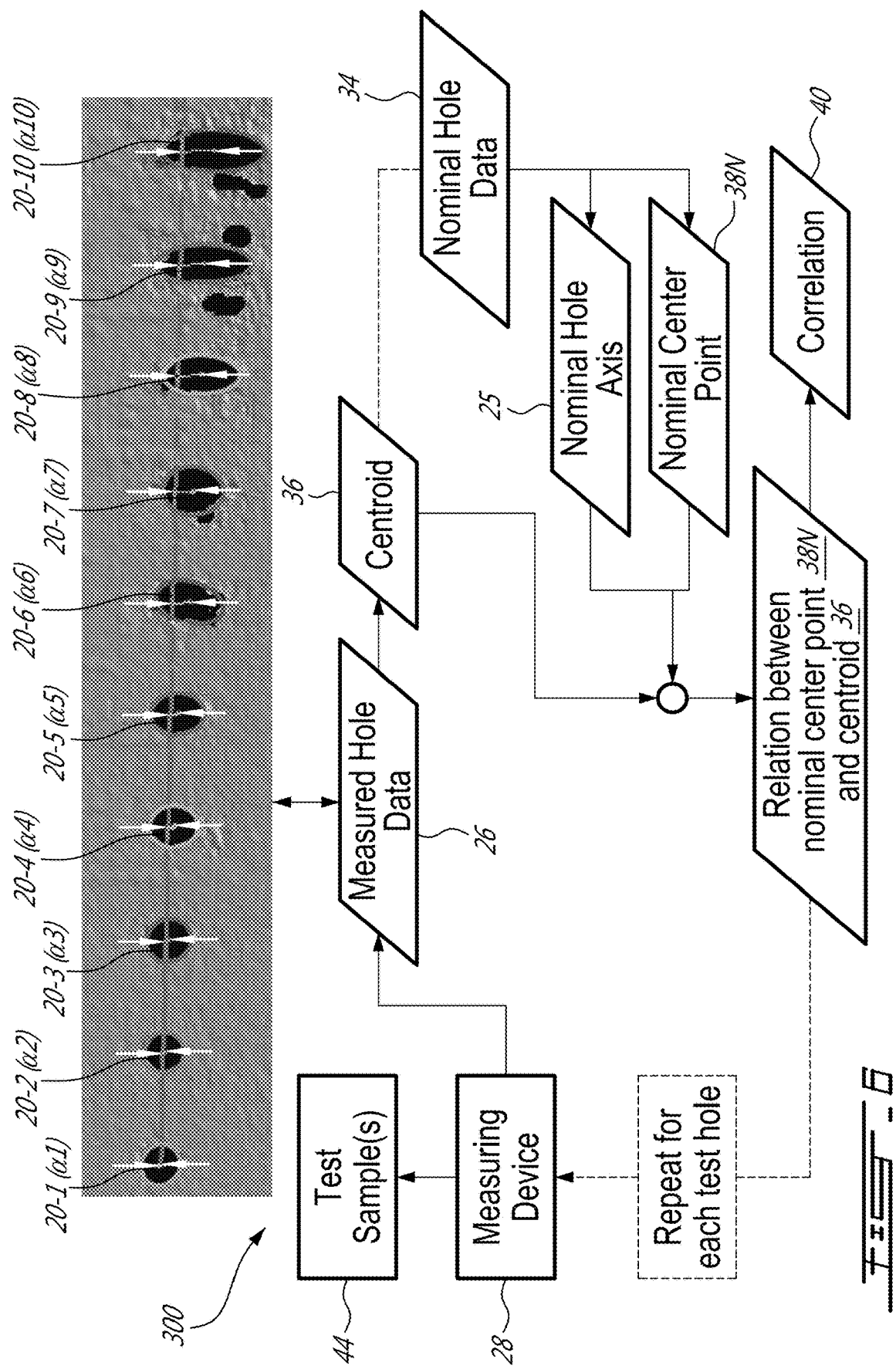
FIG. 6 is a flow diagram illustrating an exemplary method for determining a correlation for assisting with repairing the part.

FIG. 6 is a flow diagram illustrating an exemplary method 300 for determining correlation 40 for assisting with repairing part 22. Aspects of method 300 can be combined with aspects of other methods disclosed herein. Some aspects of method 300 can be performed with the use of a computer and can be automated. In various embodiments of method 300, correlation 40 may be determined based on one or more test holes (e.g., 20-1 to 20-10) formed in test sample 44 by laser drilling. Test sample 44 and holes 20-1 to 20-10 drilled therein can be representative of part 22 and holes 20 drilled therein. For example, test sample 44 can be made from the same or a similar material type than part 22; test sample 44 can have the same or a similar thickness as part 22; test holes 20-1 to 20-10 can be formed based on the same or similar nominal hole definitions (e.g., diameters, orientations, depths) as holes 20 in part 22 and/or test holes 20-1 to 20-10 can be formed using the same or similar laser drilling parameters as holes 20 in part 22. In any case, the use of test sample 44 permits the establishment of correlation 40 that can also apply to holes 20 formed in part 22.

Method 300 can comprise forming a plurality of test holes 20-1 to 20-10 in one or more test samples 44 using laser drilling. Test holes 20-1 to 20-10 can have different respective nominal center points 38N and different respective nominal hole axes 25 at respective orientations α1-α10. In some embodiments, the range of orientations defined by α1-α10 should cover the orientations of interest among holes 20 to be cleared from the replacement TBC 24 in part 22. Measuring device 28 can be used to acquire measured hole data 26 for the plurality of test holes 20-1 to 20-10. The top of FIG. 6 shows a graphical representation of measure hole data 26 acquired from test sample 44 via measuring device 28. From measured hole data 26, respective outlines of openings 20B of test holes 20-1 to 20-10 formed in the surface of test sample 44 can be identified for each test hole 20-1 to 20-10. Respective centroids 36 of those outlines of openings 20B can also be determined. Using the determined centroids 36, respective nominal holes axes 25 and nominal center points 38N can be identified in nominal hole data 34 (e.g., CAD model) used as a basis for forming test holes 20-1 to 20-10 by laser drilling.

In some embodiments, centroid 26 and nominal center point 38N can lie in a same plane of opening 22B of a test hole. Using centroid 26 and nominal center point 38N, a relation (e.g., distance and optionally an associate direction) can be determined between centroid 36 and nominal center point 38N of the applicable test hole 20-1 to 20-10. The determined relation can then be associated with the applicable orientation $\alpha 1$-$\alpha 10$ and stored for subsequent use for clearing holes 20 in part 22. The above process can be repeated for each test hole 20-1 to 20-10 in order to define correlation 40 over a range of hole orientations $\alpha$ as needed based on the corresponding range of hole orientations $\alpha$ of holes 20 to be cleared in part 22. For example, test hole 20-1 can have a nominal hole axis 25 that is substantially normal to the surface of test sample 44. Test hole 20-10 can have a nominal hole axis 25 oriented at an angle $\alpha 10$ of about 20 degrees from the surface of test sample 44. Other test holes 20-2 to 20-9 can have nominal hole axes at respective angles $\alpha 2$-$\alpha 9$ that are between 90 degrees and 20 degrees from the surface of test sample 44 in order to provide sufficient data points to define correlation 40 that spans over the range of orientations $\alpha$ of test holes 20-1 to 20-10.

As explained in relation to FIG. 5, correlation 40 can then be applied to hole 20 of part 22 to determine actual center point 38A and nominal hole axis 25 based on the identified centroid 36. Laser drilling instructions 42 can then be generated to instruct laser drilling system 32 to drill hole 20 using actual center point 38A and along nominal hole axis 25 retrieved from nominal hole data 34. Aspects of method 300 are further described below in reference to FIGS. 7-9.

FIG. 7 is a perspective view of an exemplary test sample 44 used to establish correlation 40. A plurality of test holes 20-1 to 20-N have been formed in test sample 44 by laser drilling. Test holes 20-1 to 20-N have been drilled at different orientations $\alpha$ to cover a range of orientations $\alpha$ applicable to holes 20 to be cleared in part 22. In the example shown, two rows have been drilled for establishing correlation 40 over the desired span of hole orientations $\alpha$. It is understood that the number of test holes 20-1 to 20-N can be selected to obtain statistically relevant data for establishing correlation 40. For example, data points at respective hole orientations $\alpha$ can be based on averages of data acquired from multiple test holes 20-1 to 20-N. In the rows of test holes 20-1 to 20-N illustrated, the nominal hole axes 25 vary from normal (e.g., $\alpha=90°$) to the surface at one end of the row (i.e., at hole 20-1), progressively decrease to a minimum oblique angle (e.g., $\alpha=20°$) near the middle of the row and then progressively increase back to normal (e.g., $\alpha=90°$) to the surface at the opposite end of the row (i.e., at hole 20-N).

FIG. 8 is a perspective graphical representation of an exemplary opening 20B of test hole 20-8 drilled in test sample 44. The graphic representation can be based on measured hole data 26 and nominal hole data 34. FIG. 8 shows an elliptically-shaped outline of test hole 20-8 formed on the surface of test sample 44, centroid 36 determined from the outline, nominal center point 38N, nominal hole axis 25 and a circle representing nominal diameter 46 of test hole 20-8. The circle can be centered on nominal center point 38N and oriented to be normal to nominal axis 25.

The laser drilling of test holes 20-1 to 20-N and the acquisition of measured hole data 26 can be performed based on common datum references that can be part of test sample 44 or to a fixture to which test sample 44 is mounted. In some embodiments, test sample 44 and its associate fixture can be moved from laser drilling system 32 to measuring device 28 using the same fixture so as to retain the same datum between the two stations. Accordingly, adequate dimensional accuracy can be maintained between the laser drilling step and the data acquisition step so that, for the purpose of test holes 20-1 to 20-N, it can be assumed that nominal center points 38N can substantially correspond to respective actual center points 38A. In some embodiments where the outline of opening 20B is elliptical, the relation between centroid 26 and nominal center point 38N can represent a dimensional offset along a major axis of the elliptical outline. The direction of the offset can be toward the direction in which nominal hole axis 25 is leaning with respect to the top surface of test sample 44.

In some embodiments, test holes 20-1 to 20-N can be disposed in a row where their nominal center points 38N are all positioned along a straight line. For simplicity in such situations, correlation 40 can be based on individual distances between respective centroids 36 and the straight line.

FIG. 9 is a plot illustrating an exemplary correlation 40 for assisting with repairing part 22. The plot shows data points associated with test holes (e.g., 20-1 to 20-N) drilled into test sample 44 at orientations ranging from $\alpha=20°$ to $\alpha=90°$. The data points represent respective distances between centroids 36 and associated nominal center points 38N for test holes (e.g., 20-1 to 20-N). The data points are provided at 5° or 10° intervals from $\alpha=20°$ to $\alpha=90°$ in order to permit fitting of a trend line through the data points. In some embodiments, correlation 40 can be stored as a compensation look-up table including discrete applicable distances with associated hole orientations $\alpha$ that can be referenced for the generation of laser drilling instructions 42 (see FIG. 5). Alternatively, a suitable mathematical function 48 can be fitted through the data points to define a continuous relationship within the range of hole orientations $\alpha$. In some embodiments, such mathematical function 48 can be a polynomial. In some embodiments, such mathematical function 48 can be a fourth order polynomial.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method for clearing a combustor hole at least partially obstructed by a coating on a combustor part of a gas turbine engine, the method comprising:

receiving the combustor part, the combustor part being a sheet having a coated side coated with the coating and an uncoated side opposite the coated side, the combustor hole extending through a thickness of the sheet from the coated side to the uncoated side of the sheet, an obstructed opening of the combustor hole on the coated side of the sheet being at least partially obstructed by coating material from the coating, the combustor hole having an unobstructed opening on the uncoated side of the sheet unobstructed by the coating material;

acquiring measured hole data indicative of a position of the unobstructed opening of the hole on the uncoated side of the sheet by measuring an outline of the unobstructed opening defined on a surface of the uncoated side of the sheet; and clearing the obstructed opening of the combustor hole of the coating material at least partially obstructing the obstructed opening by laser drilling through the coating material from the uncoated side of the sheet and from the unobstructed opening of the combustor hole based on the measured hole data;

wherein:
   a nominal axis of the hole is non-normal to the surface of the uncoated side of the sheet comprising the unobstructed opening;
   the method includes:
      using the measured hole data, identifying a centroid of the outline of the unobstructed opening of the combustor hole defined on the surface of the uncoated side of the sheet, the centroid being different from an actual center point of the combustor hole;
      using the nominal axis of the combustor hole, the centroid and a correlation, determining the actual center point of the hole, the correlation defining a relation between the centroid and an actual center point of the combustor hole as a function of the nominal axis of the combustor hole; and
      generating laser drilling instructions using the actual center point and the nominal axis of the combustor hole.

2. The method as defined in claim 1, wherein:
the correlation is based on measured test data associated with a test hole formed by laser drilling through a surface of a test sample;
the test hole has a nominal test hole axis that is non-normal to the surface of the test sample;
the measured test data is indicative of an outline of an opening of the test hole defined on the surface of the test sample; and
the correlation comprises a distance between a centroid of the outline of the opening of the test hole and a nominal center point of the test hole.

3. The method as defined in claim 1, wherein:
the correlation is based on measured test data associated with a plurality of test holes formed by laser drilling through a surface of a test sample;
the test holes have different nominal test hole axis orientations that are non-normal to the surface of the test sample;
the measured test data is indicative of an outline of an opening of each test hole defined on the surface of the test sample; and
the correlation comprises respective distances between a centroid of the outline of the opening of each test hole and a nominal center point of each test hole.

4. The method as defined in claim 1, comprising using the measured hole data to retrieve the nominal axis of the combustor hole.

5. A method for repairing a gas turbine engine part having a coated first side and an uncoated second side opposite the first side, the part having a hole extending through the part from the first side to the second side, the method comprising:
removing an existing coating from the coated first side of the part;
applying a new coating on the first side of the part, coating material from the new coating at least partially obstructing an obstructed opening of the hole on the first side of the part;
after applying the new coating on the first side of the part, acquiring measured hole data indicative of a position of an unobstructed opening of the hole on the uncoated second side of the part opposite the first side, acquiring the measured hole data including measuring an outline of the unobstructed opening on a surface of the uncoated side of the gas turbine engine part; and
clearing the obstructed opening of the hole of the new coating material at least partially obstructing the obstructed opening by laser drilling through the coating material from the uncoated side of the gas turbine engine part and from the unobstructed opening of the hole based on the measured hole data;
wherein:
   a nominal axis of the hole is non-normal to a surface of the second side of the part comprising the unobstructed opening, and the outline defined by the unobstructed opening is an elliptical outline; and
   the method includes:
      using the measured hole data, identifying a center of the elliptical outline defined by the unobstructed opening of the hole on the surface of the second side, the center of the elliptical outline being different from an actual center point of the hole;
      using the nominal axis of the hole, the center of the elliptical outline and a correlation, determining the actual center point of the hole, the correlation defining a relation between the center of the elliptical outline and an actual center point of the hole as a function of the nominal axis of the hole; and
      generating laser drilling instructions using the actual center point and the nominal axis of the hole.

6. The method as defined in claim 5, wherein:
the correlation is based on measured test data associated with a test hole formed by laser drilling through a surface of a test sample;
the test hole has a nominal test hole axis that is non-normal to the surface of the test sample;
the measured test data is indicative of a center of an elliptical outline defined by an opening of the test hole on the surface of the test sample; and
the correlation comprises a distance between the center of the elliptical outline defined by the opening of the test hole and a nominal center point of the test hole.

7. The method as defined in claim 5, wherein the second opening of the hole is substantially unobstructed by the coating material.

8. A method for clearing an obstructed hole in a gas turbine engine part using laser drilling, the gas turbine engine part having a coated side and an uncoated side opposite the coated side, the obstructed hole being obstructed by coating material from a coating applied to the coated side of the gas turbine engine part, the method comprising:
- forming a plurality of test holes in one or more test samples using laser drilling, the test holes having different respective nominal center points and different respective nominal hole axis orientations, the nominal hole axis orientations being non-normal to a surface in which the respective test holes are formed;
- determining, from measured data acquired from the plurality of test holes, respective centroids of outlines defined by openings of the test holes on one or more surfaces of the one or more test samples;
- identifying a correlation between the centroids and the nominal center points of the test holes as a function of nominal hole axis orientation, the centroids being different from the respective nominal center points of the test holes;
- determining, from measured data acquired from the obstructed hole in the gas turbine engine part, a centroid of an outline defined by an opening of the obstructed hole on a surface of the uncoated side of the gas turbine engine part, the centroid of the outline defined by the opening of the obstructed hole being different from an actual center point of the obstructed hole; and
- clearing the obstructed hole of the coating material obstructing the obstructed hole by laser drilling using the actual center point of the obstructed hole determined from the correlation and the centroid of the outline defined by the opening of the obstructed hole on the surface of the part, the laser drilling being done through the coating material from the uncoated side of the gas turbine engine part;
- wherein the opening of the obstructed hole is an unobstructed opening of the obstructed hole and the method comprises clearing an obstructed opening of the obstructed hole by laser drilling via the unobstructed opening of the obstructed hole.

9. The method as defined in claim 8, comprising clearing the obstructed hole by laser drilling along a nominal hole axis of the obstructed hole.

10. The method as defined in claim 8, comprising:
- using the measured data acquired from the obstructed hole to identify a nominal hole axis of the obstructed hole; and
- using the nominal hole axis of the obstructed hole and the correlation to identify the actual center point of the obstructed hole.

11. The method as defined in claim 8, wherein the different respective nominal hole axes of the test holes span over a range of orientations and the correlation is continuous over the range of orientations.

12. The method as defined in claim 11, wherein the correlation comprises a fourth order polynomial.

* * * * *